(12) United States Patent
Gurocak et al.

(10) Patent No.: US 9,093,214 B2
(45) Date of Patent: Jul. 28, 2015

(54) MAGNETORHEOLOGICAL DEVICES AND ASSOCIATED METHODS OF CONTROL

(75) Inventors: Hakan Gurocak, Vancouver, WA (US); Doruk Senkal, Pullman, WA (US); Berk Gonenc, Baltimore, MD (US)

(73) Assignee: Washington State University, Pullman, WA (US)

(*) Notice: Subject to any disclaimer, the term of this patent is extended or adjusted under 35 U.S.C. 154(b) by 56 days.

(21) Appl. No.: 14/114,879

(22) PCT Filed: May 2, 2012

(86) PCT No.: PCT/US2012/036100
§ 371 (c)(1),
(2), (4) Date: Oct. 30, 2013

(87) PCT Pub. No.: WO2012/154466
PCT Pub. Date: Nov. 15, 2012

(65) Prior Publication Data
US 2014/0085765 A1      Mar. 27, 2014

Related U.S. Application Data

(60) Provisional application No. 61/483,119, filed on May 6, 2011, provisional application No. 61/536,279, filed on Sep. 19, 2011.

(51) Int. Cl.
*H01H 47/00* (2006.01)
*H01F 38/00* (2006.01)
*F16F 9/53* (2006.01)
*F16F 13/30* (2006.01)

(52) U.S. Cl.
CPC *H01F 38/00* (2013.01); *F16F 9/53* (2013.01); *F16F 9/535* (2013.01); *F16F 13/305* (2013.01); *Y10T 137/206* (2015.04)

(58) Field of Classification Search
USPC ................................ 361/139, 144, 160, 152; 188/267.1–267.2
See application file for complete search history.

(56) References Cited

U.S. PATENT DOCUMENTS

| 6,186,290 | B1 | 2/2001 | Carlson |
| 6,527,661 | B2 | 3/2003 | Leeper |
| 6,650,108 | B2 | 11/2003 | Carlson et al. |

(Continued)

FOREIGN PATENT DOCUMENTS

WO       2010101902       9/2010

OTHER PUBLICATIONS

International Search Report and Written Opinion issued Sep. 24, 2012, in International Application No. PCT/US2012/36100.

(Continued)

*Primary Examiner* — Danny Nguyen
(74) *Attorney, Agent, or Firm* — Liang IP, PLLC

(57) ABSTRACT

Embodiments of magnetorheological systems, devices, and associated methods of control are described below are described herein. In one embodiment, a magnetorheological device includes an magnetorheological fluid, a shaft proximate and mechanically coupled to the magnetorheological fluid, and a magnetic field generator configured to generate a magnetic flux through the magnetorheological fluid along a magnetic flux path. The magnetorheological device also includes a sensor positioned in the magnetic flux path and configured to measure a current value of magnetic inductance of the magnetic flux flowing through the magnetorheological fluid.

21 Claims, 16 Drawing Sheets

(56) References Cited

U.S. PATENT DOCUMENTS

2007/0285195 A1* 12/2007 Nehl et al. .................. 335/209
2010/0199519 A1* 8/2010 Battlogg ....................... 36/83

OTHER PUBLICATIONS

Conference on Robotics and Automation, May 9-13, 2011, China, Alex S. Shafer et al., pp. 4266-4271. Title-Design and Validation of a Magneto-Rheological Clutch for Practical Human-Friendly Manipulation.†

Conference on Intelligent Robots and Systems, Oct. 11-15, 2009, St. Louis, Alex S. Shafer et al., pp. 2904-2909. Title—On the Feasibility and Suitability of MR and ER Based Actuators in Human Friendly Manipulators.†

Transactions on Mechatronics, vol. 16, No. 6, December 2011, Alex S. Shafer et al., pp. 1073-1082. Title—On the Feasibility and Suitability of MR Fluid Clutches in Human-Friendly Manipulators.†

\* cited by examiner
† cited by third party

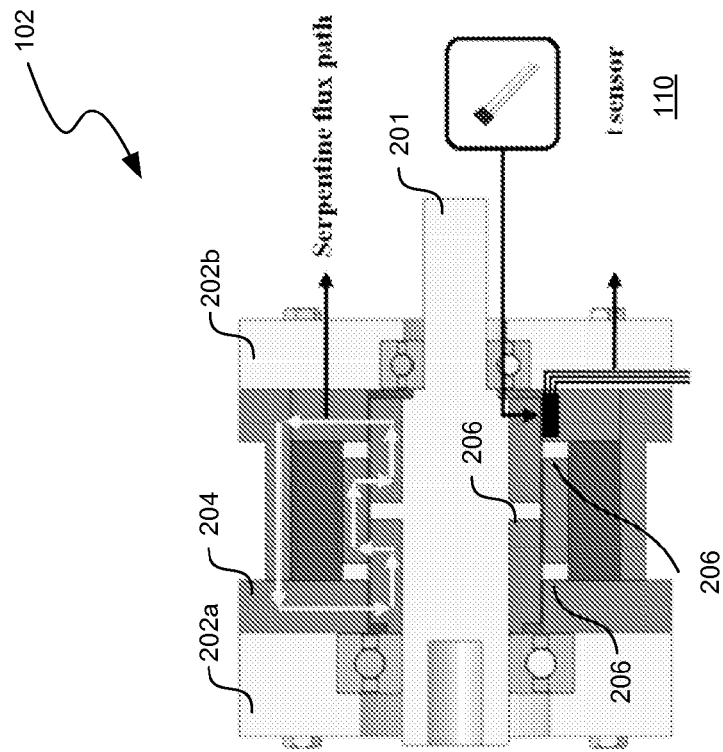
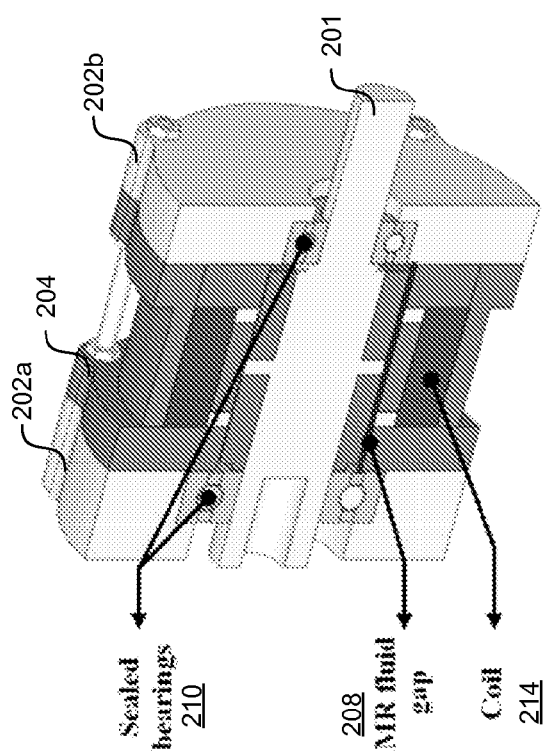
FIGURE 6B
FIGURE 6A

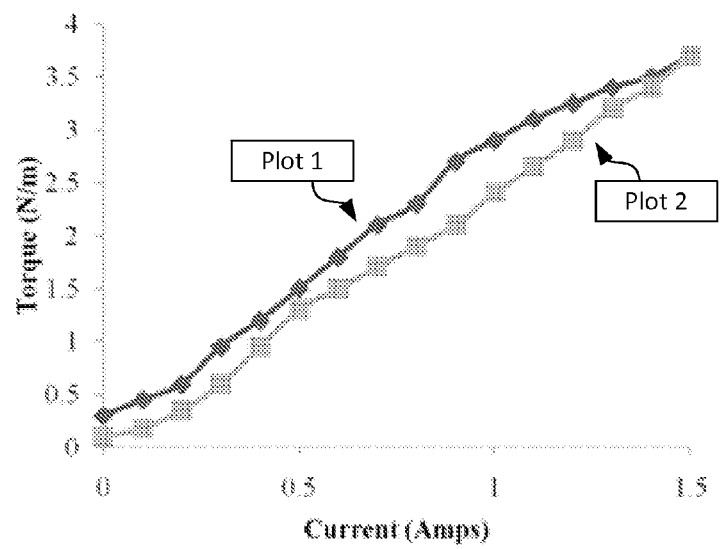
FIGURE 20
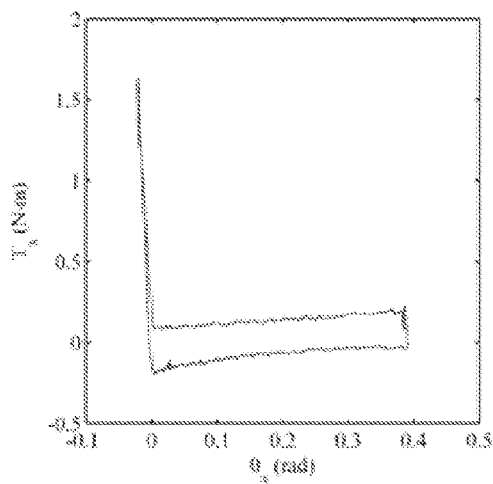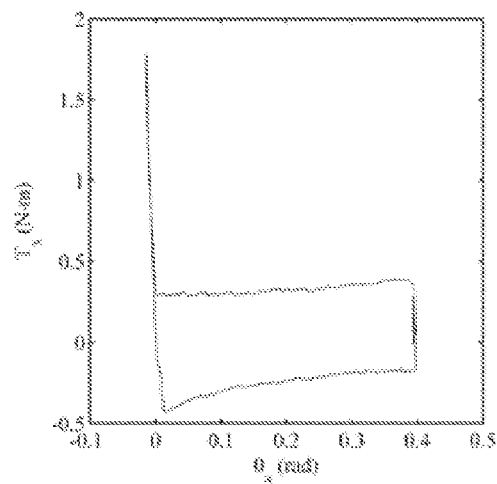
FIGURE 21A          FIGURE 21B

MAGNETORHEOLOGICAL DEVICES AND ASSOCIATED METHODS OF CONTROL

CROSS-REFERENCE TO RELATED APPLICATION(S)

This application is a National Stage Application of PCT Application No. PCT/US2012/36100, filed May 2, 2012, which claims priority to U.S. Provisional Application Nos. 61/483,119, filed on May 6, 2011, and 61/536,279, filed on Sep. 19, 2011.

STATEMENT REGARDING FEDERALLY SPONSORED RESEARCH

This work was supported in part by National Science Foundation Grant # CMMI-0969567. The government has certain rights in this work.

TECHNICAL FIELD

The present technology is related generally to magnetorheological devices and associated methods of control.

BACKGROUND

A magnetorheological ("MR") fluid is a fluid that can increase apparent viscosity when subject to a magnetic field. An MR fluid typically includes a suspension of small magnetizable particles (e.g., iron) in a carrier fluid (e.g., oil). In an inactive state, the MR fluid can have a viscosity similar to low viscosity oil. Upon application of a magnetic field, the viscosity of the MR fluid increases even to the point of becoming viscoelastic in some instances.

MR fluids can be used in various types of brakes, clutches, or actuators to provide variable resistance. Such MR devices typically have high torque-to-volume ratios, inherent stability, and simple interface between mechanical and electrical components. As a result, MR devices have been implemented in civil engineering, haptic technology, exercise equipment, automobile suspensions, tactile displays, and other technical areas.

MR devices, however, exhibit hysteresis in operation. For example, an input current can be initially applied to obtain a desired torque output from an MR device. However, after the input current is removed, the torque output of the MR device does not return to zero, but instead has a residual value. Such a behavior is commonly referred to as MR hysteresis. Conventional solutions to address MR hysteresis include generating mathematical models of particular types of actuator based on experimental data. These mathematical models require extensive experimental data, certain magnetic field assumptions, and inability to capture certain hysteresis behaviors.

BRIEF DESCRIPTION OF THE DRAWINGS

FIGS. 6A and 6B are perspective and cross-sectional views of an MR device in accordance with embodiments of the present technology.

FIG. 20 is an example braking torque versus current plot in accordance with embodiments of the present technology.

FIGS. 21A and 21B show wall collision performance plots of using feedback control versus direct current control, respectively.

DETAILED DESCRIPTION

Various embodiments of MR systems, devices, and associated methods of control are described below. The term "MR device(s)" is used throughout to refer to any mechanical and/or electrical devices incorporating an MR fluid as a working component. Examples of such MR devices can include brakes, clutches, and/or actuators. Certain example MR devices are described below with particular components and operating characteristics for illustration purposes only. Other embodiments of MR systems and/or devices in accordance with the present technology may also include other suitable components and/or may operate at other suitable conditions. A person skilled in the relevant art will also understand that the technology may have additional embodiments, and that the technology may be practiced without several of the details of the embodiments described below with reference to FIGS. 1-23B.

Overview of MR Hysteresis

Ferromagnetic materials, paramagnetic materials, and MR-fluids have been used in MR devices (e.g., brakes) to form interior structures with a magnetic flux path. Without being bound by theory, it is believed that each material in an MR device has different response characteristics to an applied magnetic field at an atomic or sub-atomic level. Paramagnetic materials (e.g., aluminum) generally do not allow magnetic induction to pass through. On the other hand, magnetic induction can flow in ferromagnetic materials (e.g., steel and iron).

It is also believed that ferromagnetic materials are a major cause of MR hysteresis. A ferromagnetic material is a combination of permanent magnetic dipoles which are assumed to be tiny polarized magnets (particles). Dipoles, which have generally the same orientation within the material, form regions called domains of polarization. The domains have dense magnetization for having similarly oriented dipoles. A ferromagnetic material is generally in a demagnetized state (commonly referred to as the state of "spontaneous magnetization") in the absence of magnetic induction because the direction of each domain is opposed by neighboring domains.

When a magnetic field is applied, the domains are believed to grow in magnetization directions according to the applied field. This also results in a change of energy balance and rearrangement of the domains. At higher values of applied field (e.g., saturation point of material), a ferromagnetic material behaves as one big domain with a particular magnetic direction. When the field is removed or reversed slowly, the domains of reversed magnetization start to form. However, the ferromagnetic material may not return to the state of spontaneous magnetization because some of the domains retain the orientation acquired under the previously applied field. Thus, residual magnetism results. In order to achieve zero magnetization after removing the applied field, an external field with an opposite direction is needed.

Figure 1:
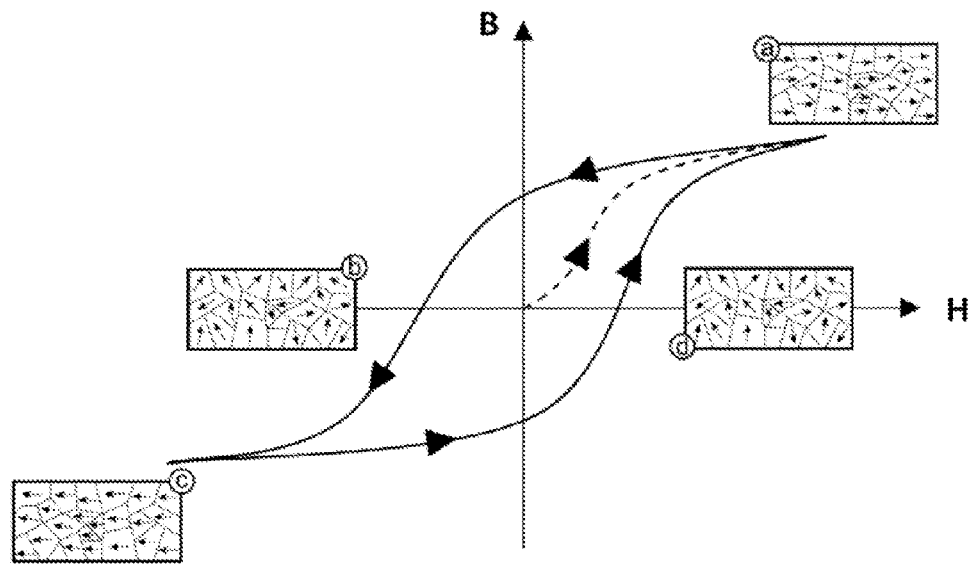
FIG. 1 is a diagram of magnetic inductance versus field strength of an MR device.

Ferromagnetic materials follow a path called a hysteresis loop which shows a lack of return to the demagnetized state. FIG. 1 illustrates a hysteresis loop and states of magnetic domains along an applied field. The shape of the hysteresis loop is directly related to the movement of the magnetic domains, and is also dependent on geometry and a spatial scale of the material.

Control of MR Devices

Without being bound by theory, it is believed that torque transmissibility of an MR device depends on dynamic yield stress and viscosity of the MR fluid used. The behavior of the MR fluid is often described by Bingham plastic model having variable yield strength. The flow is governed by:

$$\tau = \tau_y(B) + \eta \cdot \dot{\gamma}$$

The first term $\tau_y$ in this equation is dynamic yield stress, which is a function of magnetic induction (B). The second term $\eta \cdot \dot{\gamma}$ is the shear stress related to the motion, in which the parameter $\eta$ is a viscous friction coefficient, and the parameter $\dot{\gamma}$ is a shear rate. It is believed that a significant portion of a brake torque is generated by dynamic yield stress variations. Hence, the second term may be neglected, especially in low speed applications.

Figure 2:
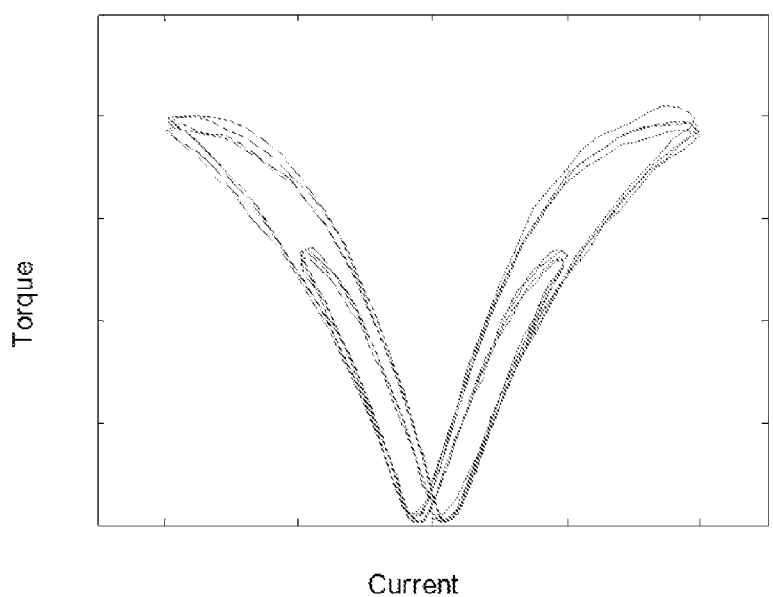
FIG. 2 is a diagram of torque versus current of an MR device.

Typically, a coil is used to generate a magnetic field in an MR device, which depends on a supply current to the coil. However, ferromagnetic materials used in the MR device structure may result in a hysteretic relation between torque output and current input as shown in FIG. 2. Depending on coil activation history, the MR device can produce different torques at the same current level. Thus, there has been a challenge and a long felt need for accurate control of MR devices.

Figure 3:
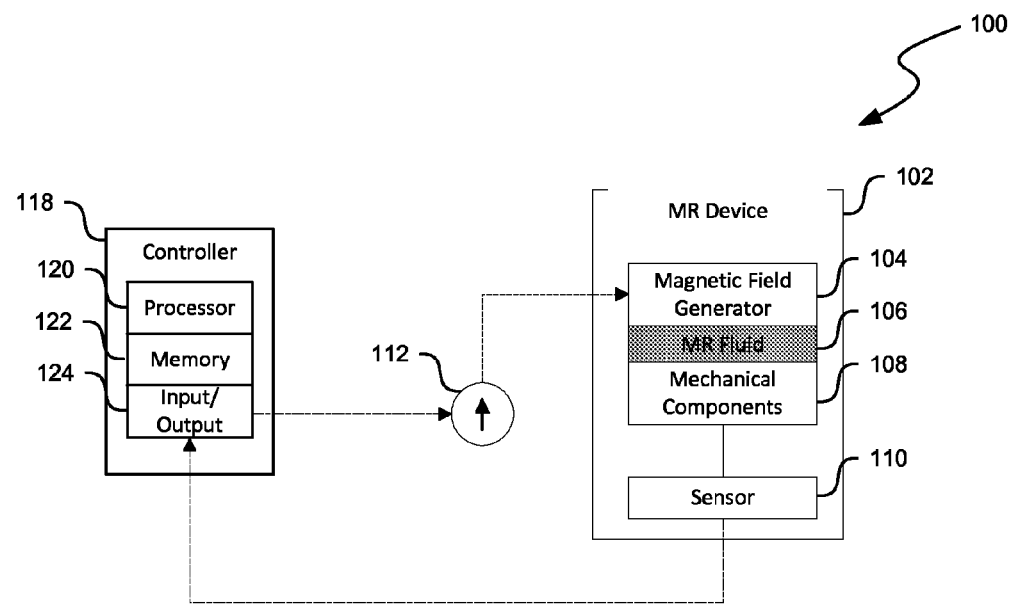
FIG. 3 is a schematic diagram of a system having an MR device in accordance with embodiments of the present technology.

FIG. 3 is a schematic diagram of a system 100 having an MR device in accordance with embodiments of the present technology. As shown in FIG. 3, the system includes an MR device 102, a power supply 112, and a controller 118 operatively coupled together. Even though only one MR device 102 is shown in FIG. 3, in other embodiments, the system 100 can also include additional MR devices (not shown) and/or other suitable components. In further embodiments, the controller 118 and the MR device 102 may be integrated into a single entity.

The MR device 102 can include a magnetic field generator 104, an MR fluid 106, mechanical components 108, and a sensor 110 operatively coupled together. The magnetic field generator 104 can include a coil, a solenoid, an electro-magnetic generator, and/or other suitable types of magnetic field generators. The MR fluid 106 can include a carrier fluid (e.g., oil) carrying a plurality of magnetic particles (e.g., micrometer or nanometer scale spheres or ellipsoids of iron). Optionally, in certain embodiments, the MR fluid 106 can also include a surfactant (e.g., oleic acid, tetramethylammonium hydroxide, citric acid, or soy lecithin). The mechanical components 108 can include at least some of a shaft, flanges, seals, fasteners, couplings, fittings, and/or other suitable mechanical parts.

The sensor 110 is configured to measure a current value of magnetic induction in the MR fluid 106. The sensor 110 can include at least one of a scalar magnetometer and a vector magnetometer. In a particular embodiment, the sensor 110 includes a Hall-effect sensor. In other embodiments, the sensor 110 can also include a rotating coil magnetometer, a proton procession magnetometer, Overhauser effect magnetometer, a fluxgate magnetometer, a Caesium vapor magnetometer, and/or other suitable types of magnetometer.

In the illustrated embodiment, the sensor 110 is embedded and positioned in the magnetic flux path of the MR device 102. The sensor 110 may be arranged such that substantially all magnetic flux flows through the sensor 110 at a target orientation (e.g., perpendicular). One example of such arrangement is discussed below in more detail with reference to FIGS. 6A and 6B. In other embodiments, at least a portion of the sensor 110 may be external to the MR device 102. In further embodiments, the MR device 102 may include both internal and external sensors 110.

Figure 4:
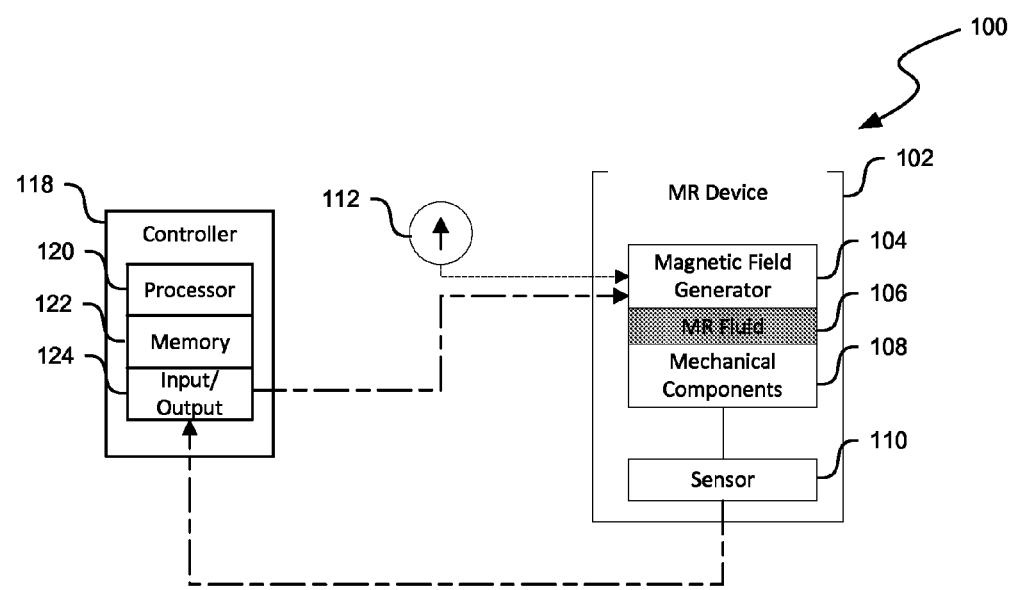
FIG. 4 is a schematic diagram of another system having an MR device in accordance with embodiments of the present technology.

The power supply 112 is configured to supply power (e.g., an electrical current) to the magnetic field generator 104 for generating magnetic induction in the MR fluid 106. In the illustrated embodiment, the power supply 112 is shown as a current source. In other embodiments, the power supply 112 can also include a voltage source and/or other suitable power supplies. In one embodiment, the power supply 112 can modulate the electrical current provided to the magnetic field generator 104 based on a control signal from the controller 118. In other embodiments, for example, as shown in FIG. 4, the power supply 112 can supply a constant current, voltage, and/or power to the magnetic field generator 104, and the magnetic field generator 104 is configured to modulate generated magnetic induction based on a control signal from the controller 118.

Referring back to FIG. 3, the controller 118 can include a processor 120 coupled to a memory 122 and an input/output component 124. The processor 120 can include a microprocessor, a field-programmable gate array, and/or other suitable logic devices. The memory 122 can include volatile and/or nonvolatile media (e.g., ROM; RAM, magnetic disk storage media; optical storage media; flash memory devices, and/or other suitable storage media) and/or other types of non-transitory computer-readable storage media configured to store data received from, as well as instructions for, the processor 120. For example, in one embodiment, the memory 122 can include data that correlate torque output to magnetic induction in the MR device 102. In other embodiments, the memory 122 may include other suitable correlations between torque output and magnetic field strength experienced by the MR fluid 106.

In the illustrated embodiment, the input/output component 124 can include an input/output module (e.g., an analog input board, not shown) configured to accept an input signal from the sensor 110 and to provide an output signal to the power supply 112. In other embodiments, the input/output component 124 can include a display, a touch screen, a keyboard, a mouse, and/or other suitable types of input/output devices configured to accept input from and provide output to an operator.

In certain embodiments, the controller 118 can include a personal computer operatively coupled to the other components of the system 100 via a communication link (e.g., a USB link, an Ethernet link, a Bluetooth link, etc.) In other embodiments, the controller 118 can include a network server operatively coupled to the other components of the system 100 via a network connection (e.g., an internet connection, an intranet connection, etc.) In further embodiments, the controller 118 can include a process logic controller, a distributed control system, and/or other suitable computing frameworks.

In operation, the power supply 112 to provide an electrical current to the magnetic field generator 104, which in turn generates and applies a magnetic field to the MR fluid 106. In response to the applied magnetic field, viscosity of the MR fluid 106 changes and resulting in a torque output via interaction (e.g., sheer stress) with the mechanical components 108. In one embodiment, the sensor 110 measures the current value of magnetic induction in the MR fluid 106 and provides the measured value to the controller 118. In other embodiments, the sensor 110 can also measure other suitable parameters indicative of at least one of strength, polarity, and/or other suitable parameters of the magnetic field in the MR fluid 106.

Figure 5A:
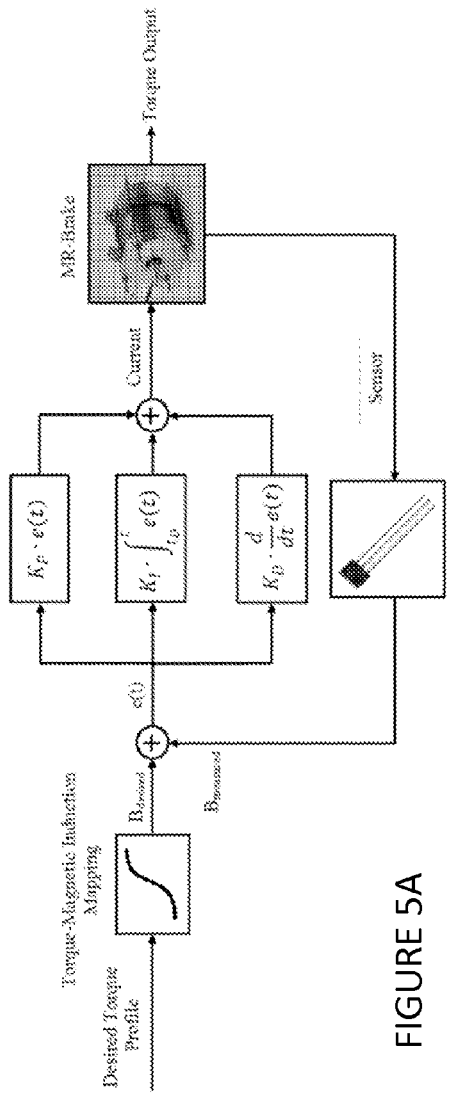
FIGS. 5A and 5B are schematic control diagrams of an MR device in accordance with embodiments of the present technology.

FIG. 5A is a schematic control diagram of the MR device 102 in accordance with embodiments of the present technology. Referring to both FIGS. 3 and 5A, the controller 118 can accept a user input for a target torque profile and then calculate a corresponding target magnetic induction ($B_{desired}$) based on torque-magnetic induction mapping stored in the memory 122. In one embodiment, the processor 120 then calculates a difference e(t) between the target magnetic induction and the current value magnetic induction from the sensor 110 as follows:

$$e(t) = B_{desired} - B_{measured}$$

The processor 120 then calculates an output signal to the power supply 122 based on proportional-integral-derivative ("PID") control scheme as follows:

$$C = K_P \cdot e(t) + K_I \cdot \int_{t_D}^{t} e(t) + K_D \cdot \frac{d}{dt} e(t)$$

Figure 5B:
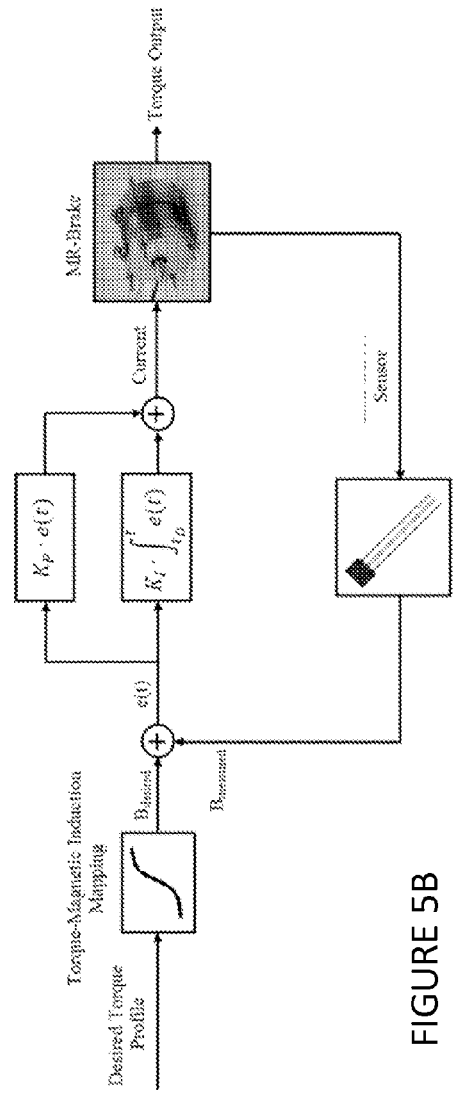

In another embodiment, as shown in FIG. 5B, the processor 120 calculates an output signal to the power supply 122 based on proportional-integral ("PI") control scheme as follows:

$$C = K_P \cdot e(t) + K_I \int_{t_D}^{t} e(t)$$

The power supply 122 then modulates the current to the magnetic field generator based on the output signal from the processor 120, and the process repeats until the target torque profile is substantially achieved.

Several embodiments of the system 100 can at least reduce if not eliminate hysteresis in the MR device 102. By positioning the sensor 110 in the magnetic flux path of the MR device 102, at least the magnetic field strength on the MR fluid 106 can be directly measured in real-time and mapped into the torque domain. It is believed that the braking torque is directly related to the magnetic flux in the MR fluid 106, so the torque output can thus be indirectly measured. Though PID and PI control schemes are discussed above, in further embodiments, cascaded, nested, step, interval, and/or other suitable control schemes may also be used.

FIGS. 6A and 6B are perspective and cross-sectional views of an MR device 102 in accordance with embodiments of the present technology. As shown in FIGS. 6A and 6B, the MR device 102 includes a shaft 201, a pair of flanges 202a and 202b, a coil 214, and a plurality of ferromagnetic and paramagnetic rings 204 and 206 over the shaft 201 and between the flanges 202a and 202b. The MR device 102 also includes a MR fluid gap 208 between the ferromagnetic and paramagnetic rings 204 and 206 for holding the MR fluid 106 (FIG. 3). A pair of seal bearings 210 seals the MR fluid 106 inside.

In operation, a current is applied to the coils 214 to generate a magnetic field over the MR fluid gap 208. As shown in FIG. 6B, the particular arrangements of the ferromagnetic and paramagnetic rings 204 and 206 force the generated magnetic field to flow through a serpentine flux path. As a result, the magnetic flux passes through the MR fluid four times in one pass.

In one particular embodiment, to monitor the magnetic flux through the MR fluid, a linear Hall-effect sensor is embedded near the MR fluid gap 208 and in the serpentine flux path. The Hall-effect sensor is positioned such that substantially all the magnetic flux pass through the sensor. One suitable sensor is provided by Allegro Microsystems (Model No. A1323) with an average sensitivity of 2.5 mV/G. The integrated amplifier on this sensor can provide temperature compensation and dynamic offset cancellation. In other embodiments, other suitable sensors may also be used.

Experiments

Several experiments were conducted to test the performance of certain embodiments of the system 100 (FIGS. 3 and 4). In a first experiment, an MR device generally similar to that shown in FIGS. 6A and 6B was used. In particular, the current to the coil 214 was increased from zero to 1 A and decreased back to zero with 0.1 A increments. This process was repeated by reversing the current. The measured magnetic induction values are presented in FIG. 7A. Similar flux magnitudes were obtained for negative and positive current inputs. When the current was decreased back to zero, a residual magnetic flux of 0.04 T was measured.

Figure 7B:
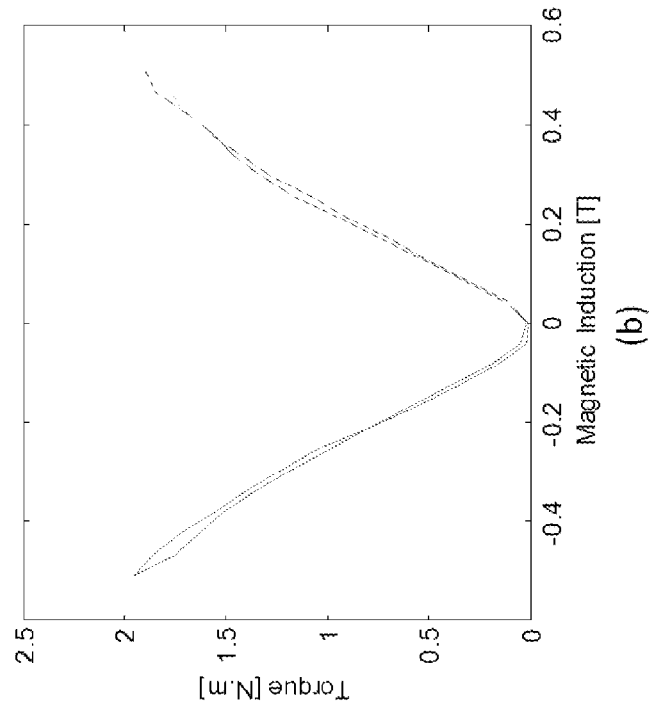
FIGS. 7A and 7B are a diagram of magnetic induction versus current and a diagram of torque versus magnetic induction in the MR device of FIGS. 6A and 6B, respectively.
Figure 7A:
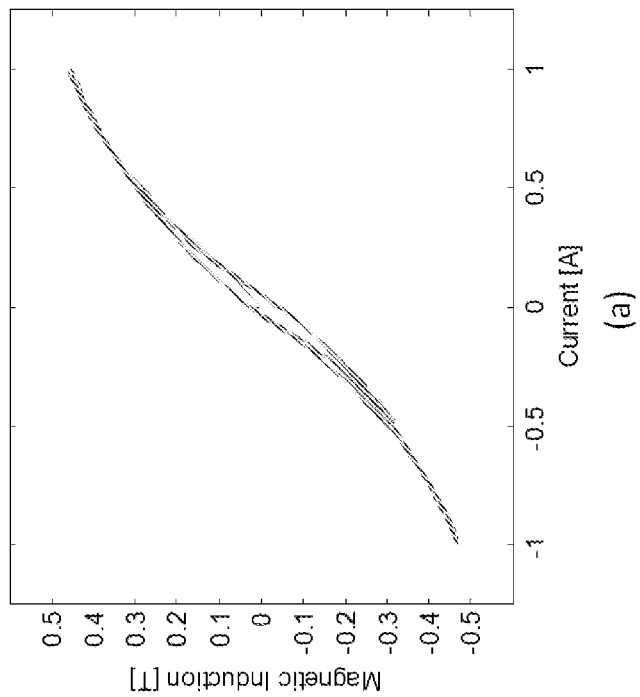

When the magnetic induction values are plotted with respect to the torque output, the hysteretic behavior observed in the torque-current curve in FIG. 2 is collapsed into an almost one-to-one correspondence as shown in FIG. 7B. This torque-magnetic induction mapping provides an accurate torque estimate based on the measured magnetic flux by the sensor 106 (FIG. 3). The mapping is then used in the input to the controller 118 (FIG. 3) for control of the torque output. The off-state torque at zero current without the foregoing feedback control was typically about 0.1 Nm, as shown in FIG. 2. In contrast, for the embodiments of the MR device 102 in FIGS. 6A and 6B, the off-state torque was about 0.03 Nm, which is a reduction of more than 300%.

Torque Response Experiments

Figure 8:
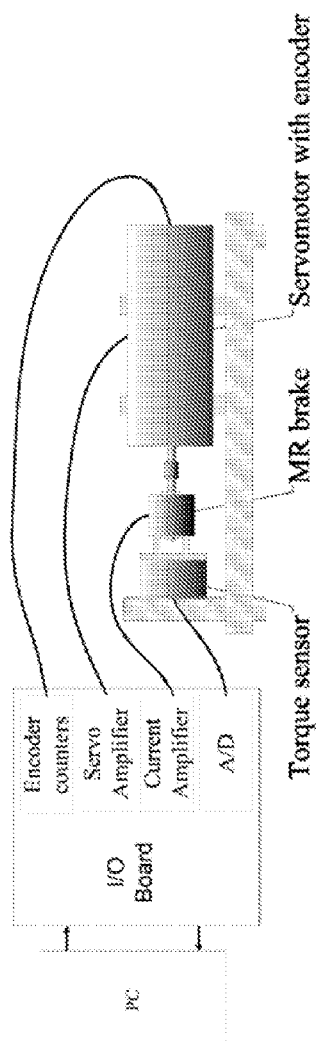
FIG. 8 is a schematic diagram of a testing system having an MR device in accordance with embodiments of the present technology.

In another experiment, the torque response of the MR device was tested. The experimental setup is shown in FIG. 8, which includes a torque sensor (Mini45-E from ATI Industrial Automation) attached to a chassis, and a motor with speed regulator to provide rotational motion. Real time control was implemented using a Quanser Q4 Series hardware-in-the-loop board connected to SIMULINK via WinCon software. In all cases, the control loop was running at 1000 Hz.

Figure 9:
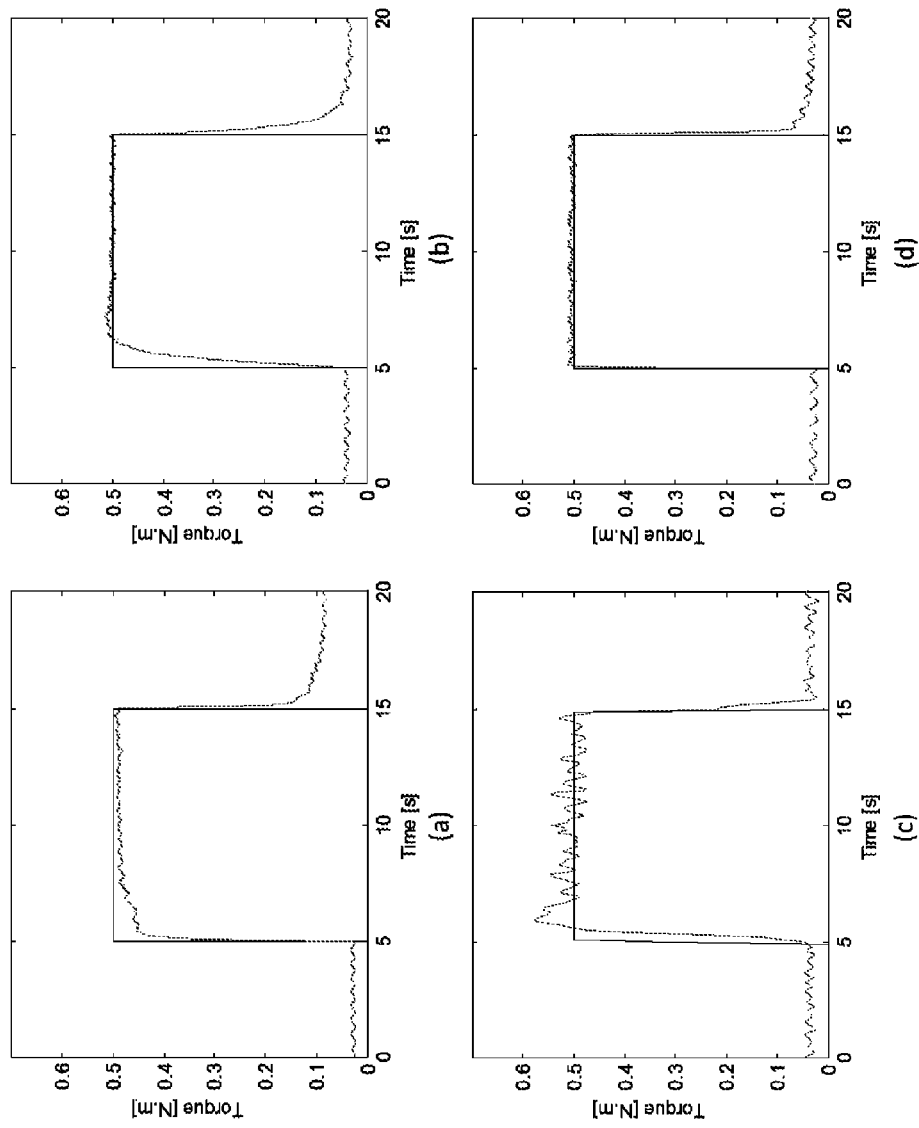
FIG. 9 shows torque versus time plots for an MR device under different control schemes.
Figure 11:
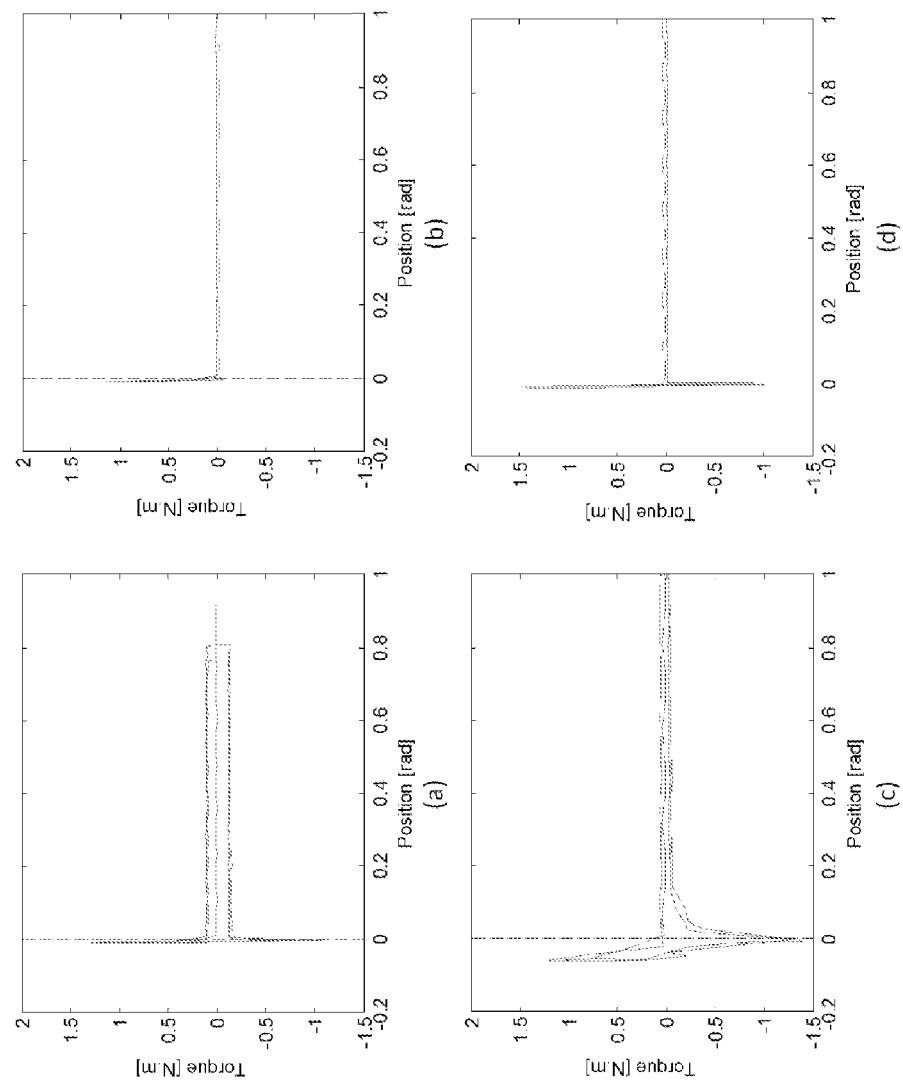
FIG. 11 shows torque versus position plots for an MR device under different control schemes.

In this set of experiments, the performance of the brake using four control approaches was conducted. During the experiments, the rotor was rotated at a constant speed while a step torque command was sent to the brake to engage it. After 10 seconds, the brake was released and the residual off-state torque was measured. The results are shown in FIG. 9.

In a first test, the coil was activated using the torque-to-current mapping based on a target torque level. Due to the hysteretic behavior, the off-state torque of the brake increased from 0.03 to 0.09 Nm after the operation, as shown in FIG. 9(a).

In a second test, closed-loop control with a torque sensor was employed. The desired torque profile was successfully tracked while the off-state torque was maintained at about 0.03 Nm after an activation cycle. The residual magnetism was canceled by a negative current input for a short duration (FIG. 9(b)).

In a third test using the Preisach hysteresis model, a similar behavior was observed. The model could successfully predict the brake behavior based on its activation history. However, the system suffered from limited resolution which resulted in fluctuations throughout the operation (FIG. 9(c)). A finer model could avoid these fluctuations but would also require much more experimental data and more computational power.

In a fourth test, the magnetic induction control discussed above with reference to FIGS. 3-5A was used with an embedded sensor. The results showed that the technique can provide the target torque profile with generally no hysteresis. After an activation cycle, the off-state torque could be brought down to the same level as before because the magnetic flux in the brake could be directly measured and brought down to zero.

Wall-Collision Experiments

One application area of MR devices is in haptic interface design due to their compact size and high torque output. Wall collision is a standard experiment used to test haptic interfaces. A virtual wall is placed in the workspace of the interface. When the interface is moved toward to contact the wall, the haptic interface is supposed to generate high and stable forces on the user's hand so that a sensation of touching a rigid virtual wall can be created.

Figure 10:
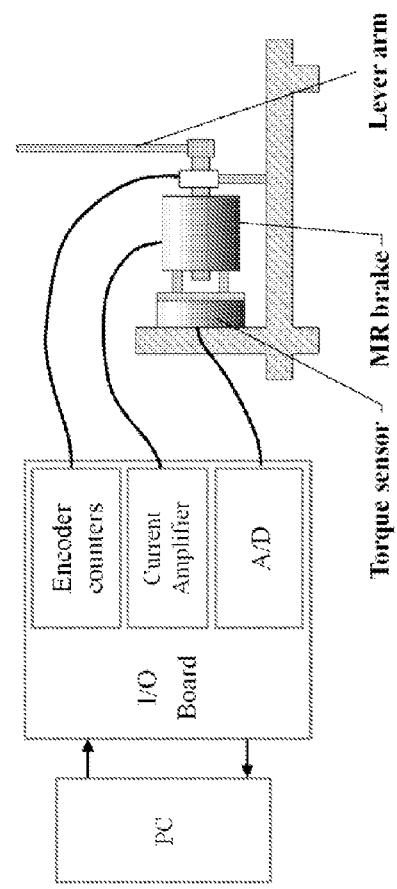
FIG. 10 is a schematic diagram of another testing system having an MR device in accordance with embodiments of the present technology.

In this experiment, as shown in FIG. 10, a rotational one degree of freedom haptic device is constructed by attaching a lever arm to the MR brake. The virtual wall was positioned at zero radian. The lever was rotated starting from about 1 radian and approached the virtual wall at zero radians. When the angular position reached zero radian, collision with the virtual wall occurred. At this point, the brake engaged applying a torque which suddenly increased to about 1 Nm simulating the rigid wall. Then, the lever was rotated back to disengage and move away from the wall. The goal was to evaluate the successful simulation of wall collision with the four control approaches tested. The results are presented in FIG. 11.

Under all control strategies, a stiff collision upon touching the wall was obtained by full activation of the brake. However, under the torque-to-current mapping approach, the residual magnetism increased the off-state torque from 0.03 Nm to almost 0.10 Nm (FIG. 11(a)). Hence, more torque was required to move away from the surface and in the free space motion after hitting the wall. The increased off-state torque is quite undesirable in haptics because it applies an artificial resistance to the user's hand.

Under the other three approaches, the off-state effect was compensated to generate free motion (almost zero torque) away from the wall by reversing the current direction until the magnetic field in the brake was canceled. Due to heavy computational load of the Preisach model and discretization, the system cannot act very fast in both canceling the residual off-state torque and generating a stiff collision effect, which caused more penetration into the virtual wall in FIG. 11(b). The closed loop magnetic induction control and closed loop torque control results were very similar except for the response while leaving the wall (FIGS. 11(c) and (d)).

Virtual Damping Experiment

In this experiment, the MR-brake was used to simulate a virtual damper for haptic applications. The goal is to generate the feeling of a damping force in the user's hand as he moves the handle at various speeds. The desired torque output was determined based on the velocity ($\dot{\theta}$) according to Equation below. The damping ratio (b) was chosen as 0.2 N·m·s/rad. The experiments were run by repeatedly increasing and decreasing the speed of the lever arm while measuring the applied damping torque.

$$T = b \cdot \dot{\theta}$$

Figure 12:
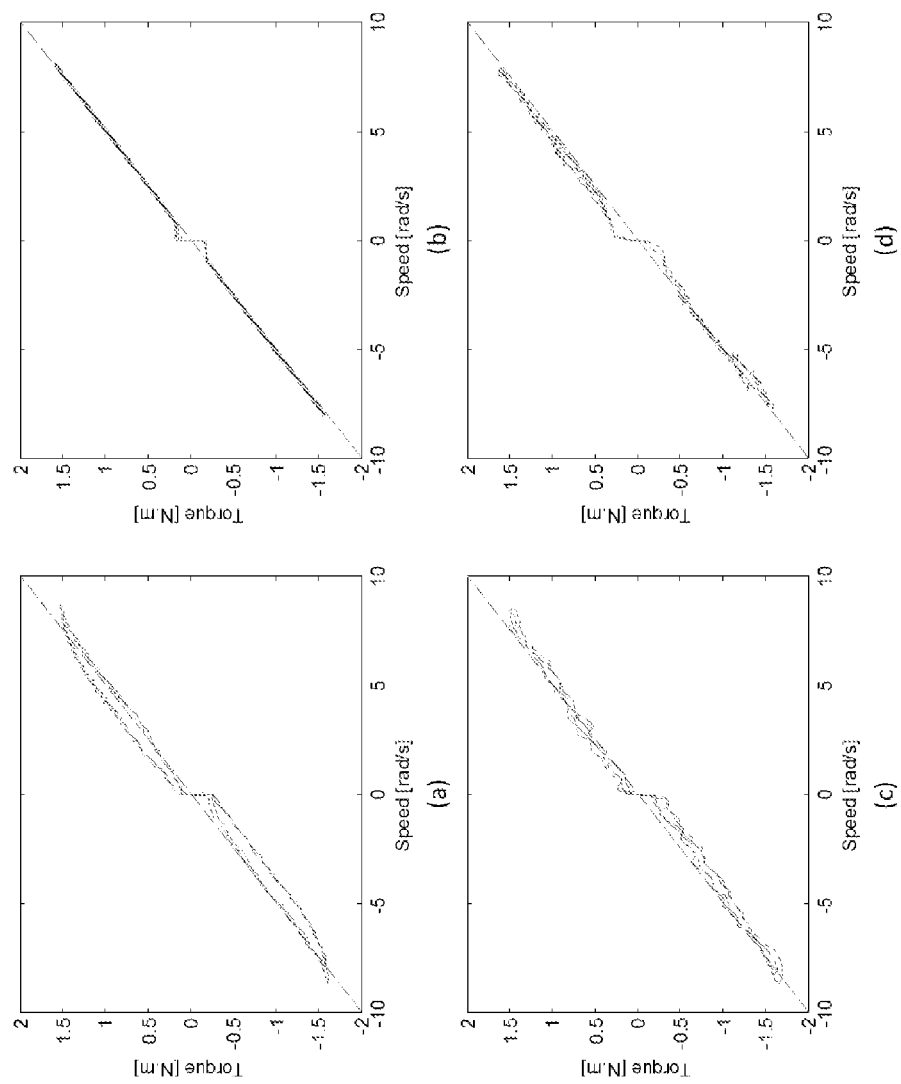
FIG. 12 shows torque versus speed plots for an MR device under different control schemes.

The damping experiment results are shown in FIG. 12.

The effect of the hysteresis was apparent in the first experiment, where the torque-to-current control strategy was used (FIG. 12(a)). During acceleration and deceleration cycles, different torque values were obtained at identical speeds, which deviated from the desired profile significantly. Using the Preisach hysteresis model, this behavior was collapsed into an almost linear response. However, due to discrete nature and limited resolution of model, fluctuations were observed (FIG. 12(c)). Closed loop torque control provided a response almost coincident with the desired profile (FIG. 12(b)). The brake exhibited a similar trend with almost no hysteresis when the magnetic induction control method was implemented (FIG. 12(d)). For each speed level, only a single torque output was monitored during both the acceleration and deceleration cycles. In all tests, the Coulomb friction became dominant in very low speeds causing the discontinuity at around zero velocity.

Figures 13A, 13B:
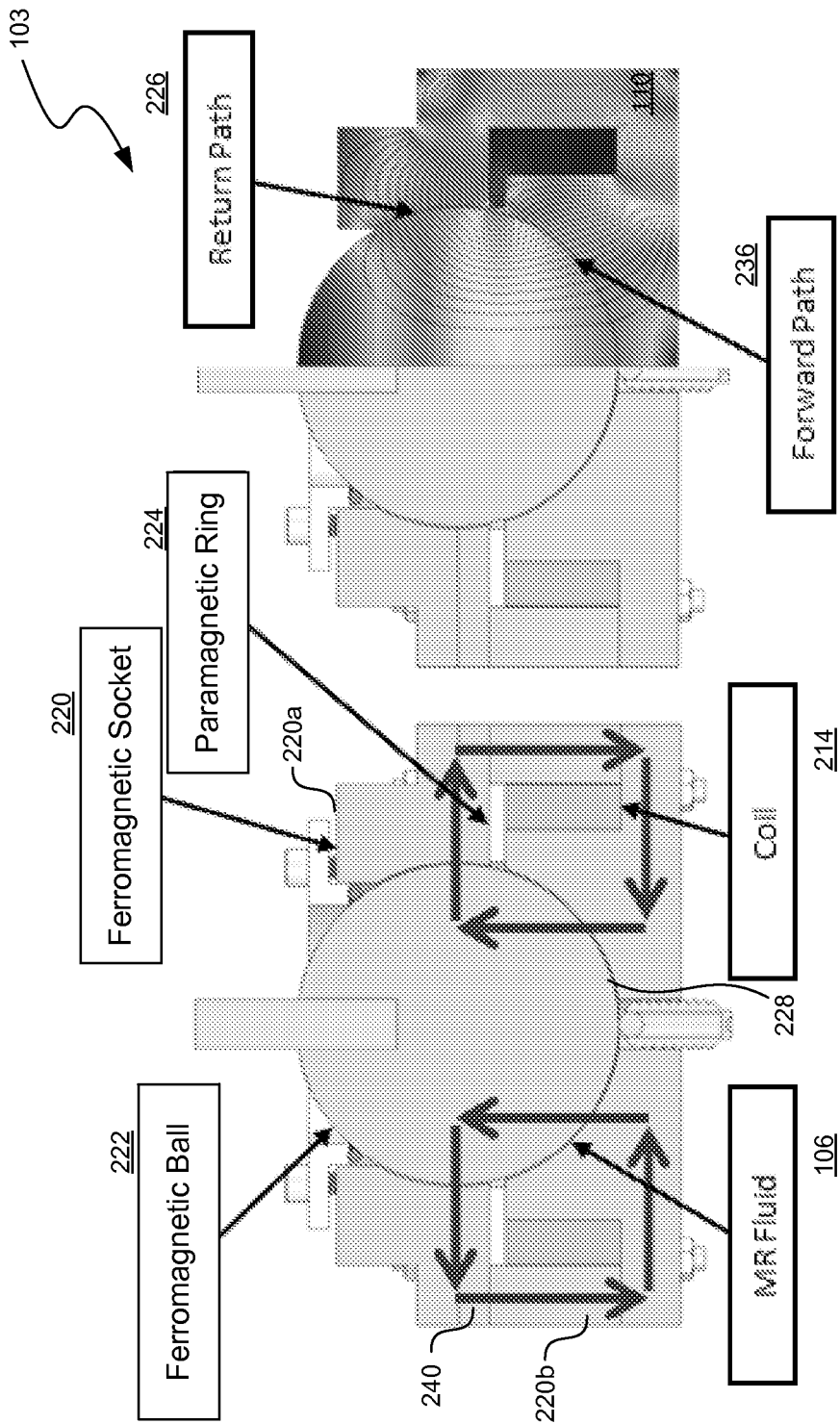
FIGS. 13A-13C are cross-sectional views of another MR device illustrating flux paths, finite element method (FEM) modeling, and an embedded sensor, respectively, in accordance with embodiments of the present technology.
Figure 13C:
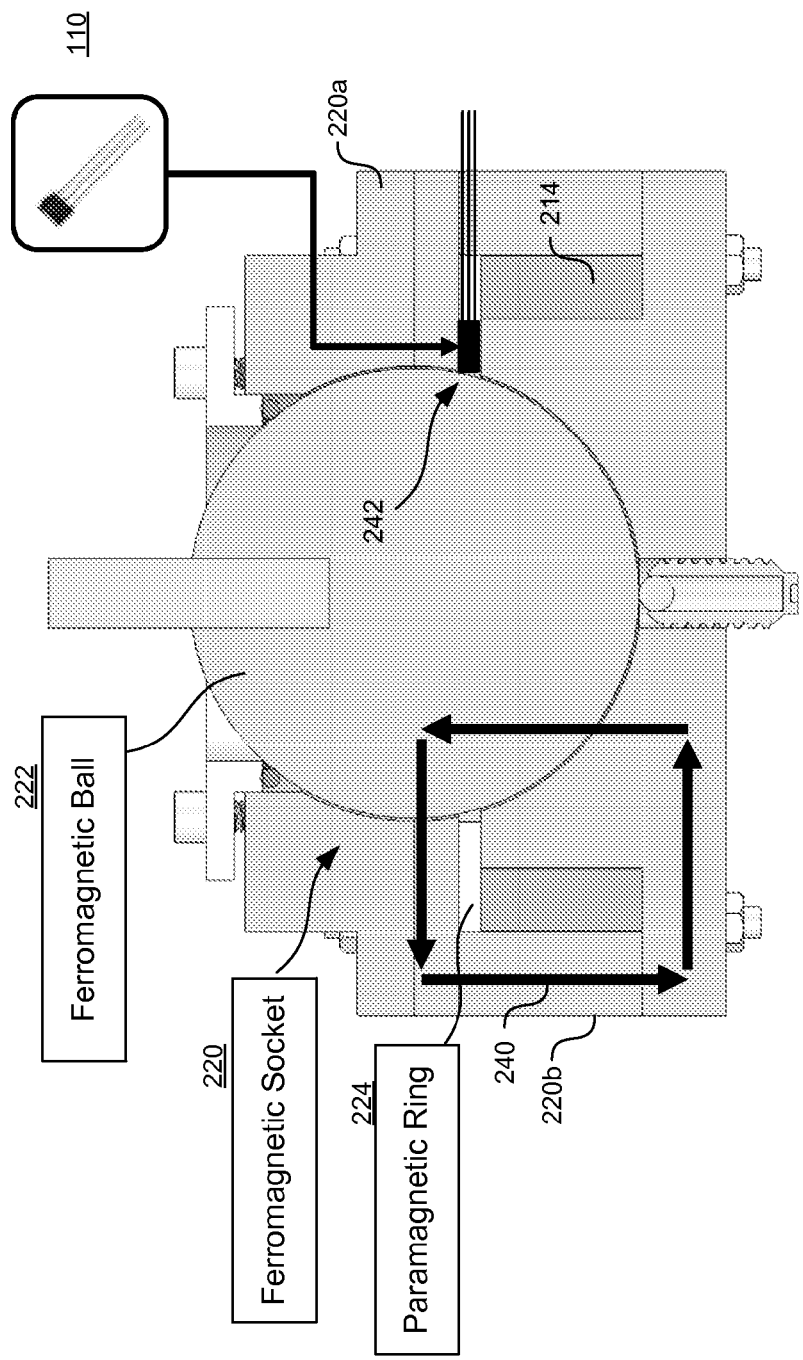

FIGS. 13A and 13B are cross-sectional views of an MR device 103 in accordance with additional embodiments of the present technology. As shown in FIGS. 13A and 13B, the MR device 103 includes a ferromagnetic socket 220 (e.g., a steel socket) having a first portion 220a and a second portion 220b, a coil 214 in the second portion 220b, and a paramagnetic ring 224 between the first portions 220a of the socket 220 and the coil 214. The MR device 102 also includes a MR fluid gap 228 between the ferromagnetic socket 220 and the ferromagnetic ball 222 for holding the MR fluid 106 (FIG. 3). As shown in FIGS. 13A and 13B, starting near the center of the coil 214, the magnetic flux path 240 jumps across the MR fluid gap 228 into the ferromagnetic ball 222. Once inside the ferromagnetic ball 222, magnetic flux continues until passing to the other side of the paramagnetic ring 224. On the other side of the paramagnetic ring 224, magnetic flux jumps across the MR fluid gap 228 once again going back into the ferromagnetic socket 220 back to the coil 214.

As shown in FIGS. 13A and 13B, the MR device 103 can be a compact multi-degree-of-freedom actuator with high torque output. In certain embodiments, the MR fluid 106 is activated with a strong, generally homogeneous magnetic field The size of the magnetically conductive parts (e.g., the ferromagnetic ball 222 and socket 220) can be selected to reduce if not prevent core saturation. It is also believed that the magnetic flux Φ is the same at any point along the magnetic circuit:

$$\Phi_{forward} = \Phi_{return} \quad (1)$$

In terms of magnetic flux density "B" and the surface area "A" through which the flux flows, the same equation can be written as:

$$B_{forward} \cdot A_{forward} = B_{return} \cdot A_{return} \quad (2)$$

As a result, the ring 224 may be placed at a location where the resulting surface areas on both the forward and return flux paths allow generally equal flux densities on both sides. In other words, the forward and return cross-sectional areas may be generally equal or may have other suitable ratios.

Figure 14:
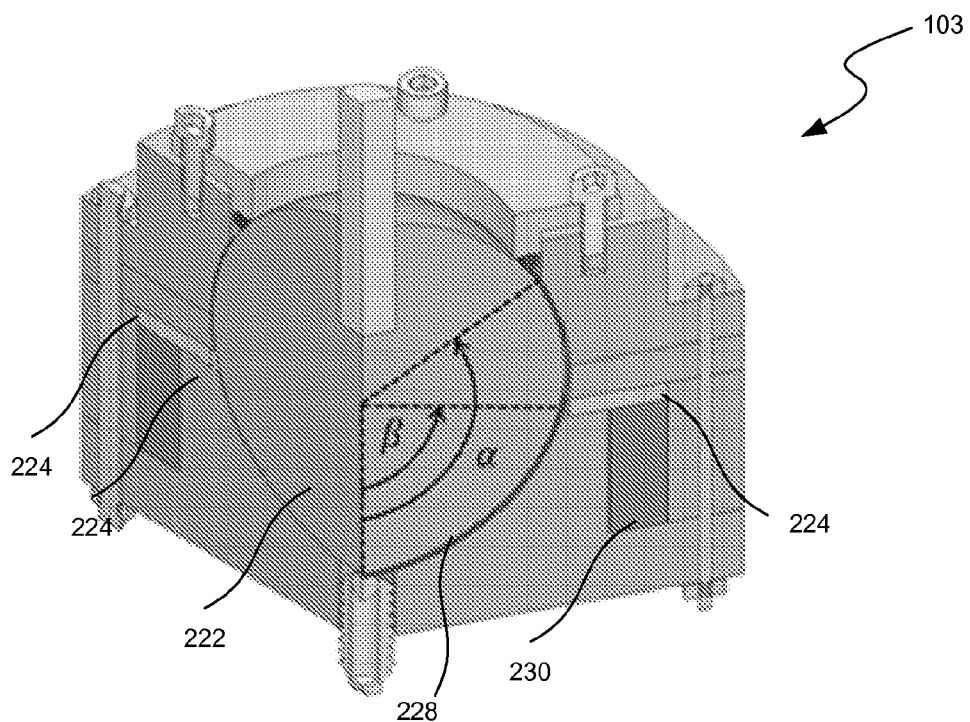
FIG. 14 is a partially cut-away perspective view of the MR device in FIGS. 13A and 13B.
Figure 15:
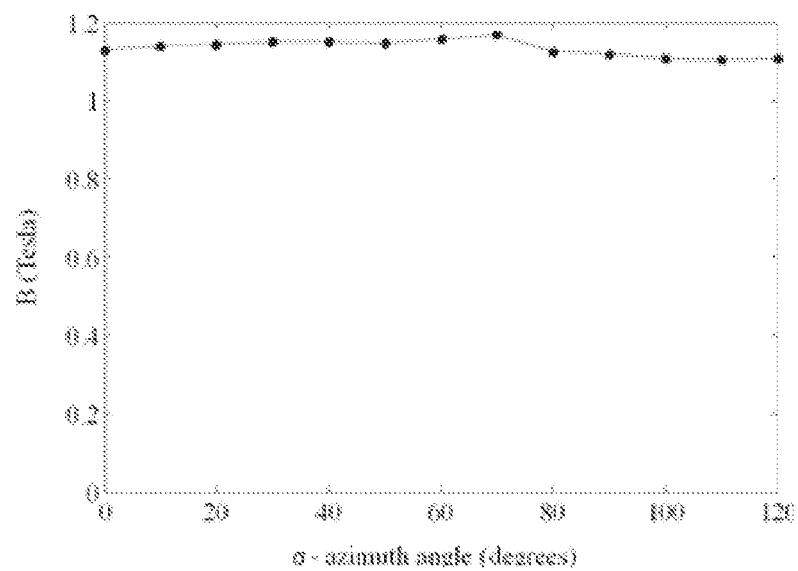
FIG. 15 is an example magnetic flux density versus azimuth angle plot for the MR device in FIGS. 13A and 13B.

As shown in FIG. 14, the following equations may be used to calculate a location of the ring 224:

$$\int_0^\beta 2\pi \cdot r^2 \cdot \sin\sigma \cdot d\sigma = \int_\beta^\alpha 2\pi \cdot r^2 \cdot \sin\sigma \cdot d\sigma \quad (3)$$

$$2\pi r^2 (-\cos\sigma)\big|_0^\beta = 2\pi r^2 (-\cos\sigma)\big|_\beta^\alpha \quad (4)$$

$$\beta = \cos^{-1}\left(\frac{1+\cos\alpha}{2}\right) \quad (5)$$

where β is the angle at which the aluminum ring is placed, α is the angle where the MR Fluid gap ends and "r" is the radius of the sphere. Increasing α has a positive effect on the torque output because of the increased MR fluid gap area. In certain embodiments, a socket size of α=120° may be selected. Then, β=75.5° may be computed as the location for the ring 224. FIG. 15 shows thirteen data points inside the MR Fluid gap 228. At 1.5 Amps 1.14±0.02 Tesla can be found throughout the MR Fluid gap. The flux density in the gap 228 can be fairly uniform as a result of the placement of the ring 224.

Figure 16:
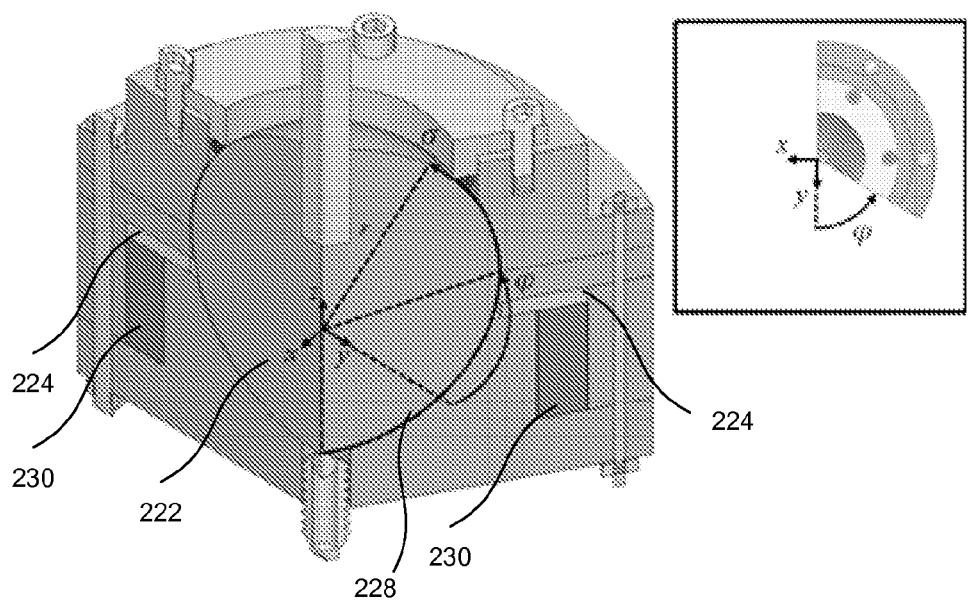
FIG. 16 is another partially cut-away perspective view of the MR device in FIGS. 13A and 13B.

As shown in FIG. 16, without being bound by theory, it is believed that the Bingham plastic model can be a model describing the shear stress of MR fluids:

$$\tau = \tau_{yd}(B) + \eta \frac{\omega \cdot r}{h} \quad (6)$$

where the first term $\tau_{yd}(B)$ is the dynamic yield stress as a function of the magnetic flux. The second term is the shear strain rate with ω is the angular velocity, "r" is the radius of the sphere, η is the viscous friction coefficient and "h" is the fluid gap.

In certain situations, a small torque due to friction (e.g. due to the seals) may also exist as a third component in the total braking torque. A portion of the braking torque is from the dynamic yield stress acting on the outer surface of the ball 222 (FIG. 14). In haptics applications, the brakes may rotate slowly. Hence, the second term in Equation 6 may be ignored. Since the MR device 103 can exert moments along all 3 axes, torque along each axis may be individually calculated by integrating the tangential component of yield stress along the ball surface for each axis. In certain embodiments, the symmetry along "z" axis may cause the torque along the "x" and "y" axes to be generally equal. In other embodiments, the torque along the "x" and "y" axes may not be equal.

Torque about the z-axis can be calculated by integrating shear stress on the sphere from σ=0 to σ=α. By taking advantage of the symmetry along the z-axis, the moment arm can be written as: r·sin σ and the shear force on an infinitesimally thick ring around the sphere can be written as: τ·2π·r² sin σ·dσ. Then the integral becomes:

$$T_z = \int_0^\alpha (r \cdot \sin\sigma) \cdot (\tau \cdot 2\pi \cdot r^2 \cdot \sin\sigma) \, d\sigma \quad (7)$$

$$T_z = \tau \cdot 2\pi \cdot r^3 \cdot \left(\frac{\sigma}{2} - \frac{\sin 2\sigma}{4}\right)\Big|_0^\alpha \quad (8)$$

Using a similar approach, torque along the "x" and "y" axes can be calculated. The torque that can be created by the surface area of the opening on the socket is subtracted from the torque that can be created by a complete sphere:

$$T_{x,y} = T_{complete} - T_{opening} \quad (9)$$

thus, $T_{complete}$ can be calculated by using equation 8 with α=π to cover the whole surface area of the sphere:

$$T_{complete} = \tau \cdot \pi^2 \cdot r^3 \quad (10)$$

The torque that needs to be subtracted due to the opening can be calculated by a double integration over the opening. The moment arm can be written as $\sqrt{(r \cdot \cos\sigma)^2 + (r \cdot \sin\sigma \cdot \sin\phi)^2}$ and shear stress at any point on the opening can be written as: r²·sin σ·dφ·dσ. Then, the double integral for the opening becomes:

$$T_{opening} = \int_0^{\pi-\alpha} 2 \int_0^\pi \tau \cdot r^3 \cdot \sin\sigma \cdot \sqrt{(\cos\sigma)^2 + (\sin\sigma \cdot \sin\phi)^2} \, d\phi \, d\sigma \quad (11)$$

Substituting into equation 9 gives:

$$T_{x,y} = \tau \cdot \pi^2 \cdot r^3 - \int_0^{\pi-\alpha} 2 \int_0^\pi \tau \cdot r^3 \cdot \sin\sigma \cdot \sqrt{(\cos\sigma)^2 + (\sin\sigma \cdot \sin\phi)^2} \, d\phi \, d\sigma \quad (12)$$

For r=20.32 mm and $\tau_{yd}$(1 Tesla)=55 kPa, the torque values that can be exerted by the MR device 103 can be found as $T_z$=3.66 Nm and $T_{x,y}$=3.28 N·m.

Because of the r³ term in equation 12, braking torque scales up with radius. The table below shows theoretical braking torques for spherical MR-Brakes at different sizes at α=120°:

| Radius (mm) | $T_z$ (N · m) | $T_{x,y}$ (N · m) |
| --- | --- | --- |
| 5 | 0.06 | 0.05 |
| 10 | 0.44 | 0.39 |
| 20.32 | 3.66 | 3.28 |
| 30 | 11.79 | 10.54 |
| 50 | 54.59 | 48.82 |

Additional Experiments

Figure 17:
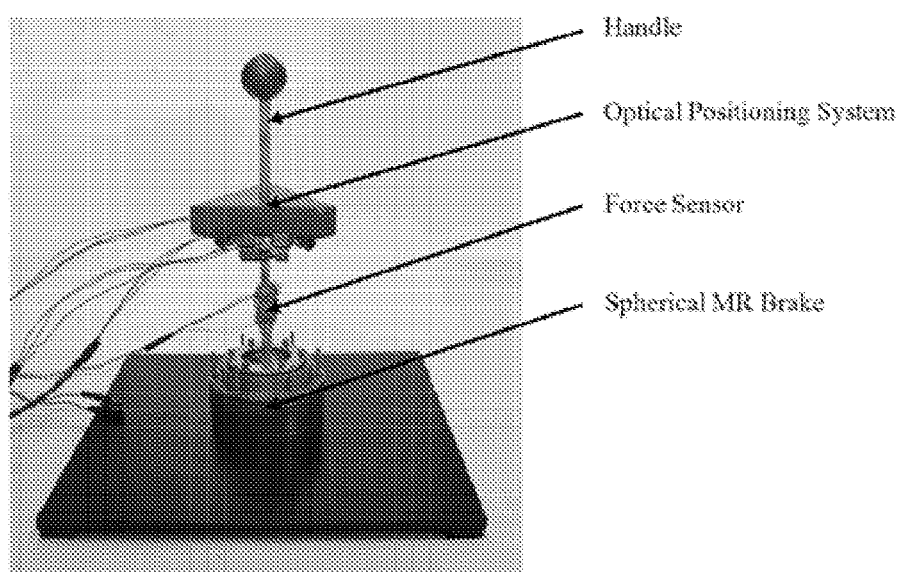
FIG. 17 shows a force feedback joystick apparatus in accordance with embodiments of the present technology.
Figure 18:
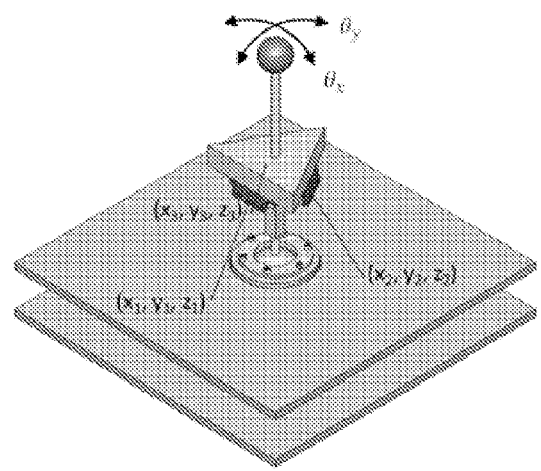
FIG. 18 is a schematic perspective view of an optical triangulation system in accordance with embodiments of the present technology.

An embodiment of the MR device 103 as a spherical MR-brake was used in the design of a force feedback joystick for haptics applications, as shown in FIG. 17. The joystick handle, equipped with force sensing, was attached to the MR device 103. An optical position measurement system was also attached to the handle. As shown in FIG. 18, three IR sensors were used to form an optical triangulation system to measure the position of the joystick handle. The sensors measure distance by sending an infrared signal and receiving the signal that bounces back from a surface. They have a range of 4 to 30 cm and generate an analog signal corresponding to the measured distance. The sensors were placed in a triangular arrangement angled slightly outward and facing down.

The optical system can measure the joystick handle position in 3D as the user moves it in any direction. As the system works by measuring the relative orientation of the base plate, rotating the base plate would have generally no effect on the position sensor readings ($d_1$, $d_2$, $d_3$). Therefore, the system may not measure rotation of the handle about its own axis. Additional sensors, such as an absolute encoder, may be used instead to measure rotation of the handle about its own axis.

When passive actuators are used in haptics applications, forces applied by a user may be measured in addition to position measurements to control the behavior of the device. If only position is measured, then the so called "sticky wall" situation may occur where the joystick would not release the brake as the user tries to pull away from a collision with a virtual object.

A load cell was built with two sets of strain gauge full bridges to measure the forces applied by a user on the handle. Although a spherical MR-brake is able to generate moments in all three degrees of freedom ("DOF"), in experiments conducted, user forces in "x" and "y" directions were measured. Virtual environments integrated with haptic devices typically run two processes. The first process involves collision detection, haptic rendering and updating the graphics in the virtual world with about 15-30 frames (or other suitable values) per second. The second process is the control loop of the haptic device which usually runs at 1000 Hz or other suitable frequencies.

Figure 19:
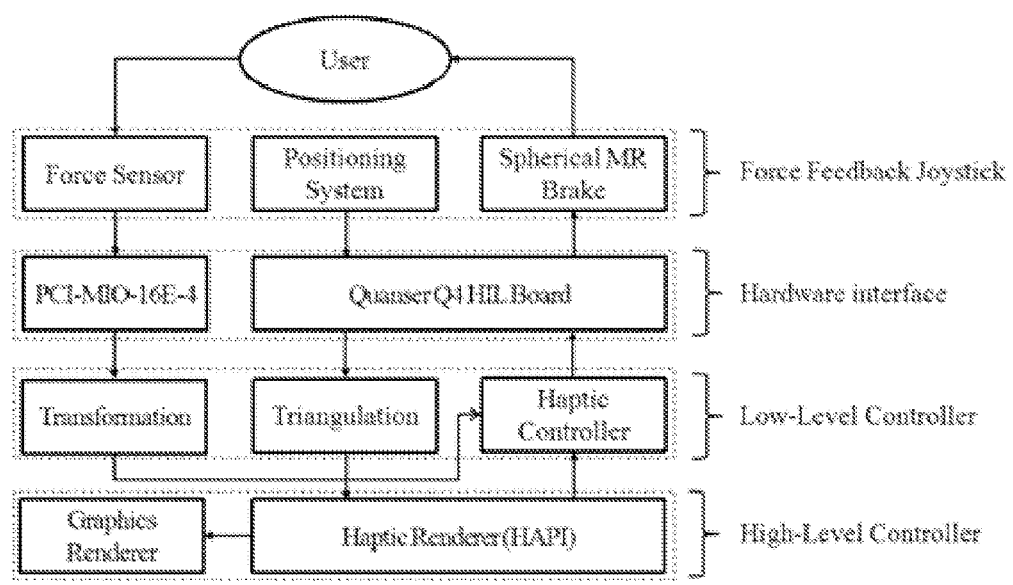
FIG. 19 is a block diagram illustrating a control system architecture in accordance with embodiments of the present technology.

As shown in FIG. 19, a two-layer control architecture having a low-level and high-level controller was implemented. The low-level controller was configured to control the haptic device and uses a Q4 hardware-in-the-loop card by Quanser, Inc., and a PCI-MIO-16E-4 data acquisition card by National Instruments. The control mechanism was implemented using Simulink by Mathworks, Inc. (Mathworks) along with the WinCon software which enables real-time code generation from Matlab/Simulink diagrams. The Q4 handled signals coming from the optical sensors and the command signal going out to the spherical MR-brake. The PCI-MIO-16E-4 handles the analog signals coming from the load-cell. The high-level controller was for the virtual environment. An open source haptics package by SenseGraphics AB (SenseGraphics) model H3DAPI was used. The H3DAPI uses OpenGL to render graphics and has own haptics renderer called HAPI. Proxy-based Ruspini algorithm for the haptic rendering was used.

The low-level controller computes coordinate transformations for the force sensor and the triangulation for the optical sensors. The data are then sent to the high-level controller which generates the command force necessary to create the haptic sensation. The command force is returned to the low-level controller which processed the command signal and the force input from the user to compute the necessary braking torque signals. This signal then goes to the spherical MR-brake through a current-controlled servo amplifier.

In one experiment, braking torque as a function of coil current was determined. The current on the coil was increased by 0.1 Amps starting from zero to 1.5 A. Then, the current was decreased using the same step size. The data from each step was taken in one minute intervals. As shown in FIG. 20, the minimum (off-state) and maximum torque were found as 0.1 Nm and 3.7 Nm, respectively. This gives a dynamic range of about 31 dB.

Hysteresis behavior can be observed in FIG. 20. As shown in FIG. 20, magnetization in ferromagnetic components did not relax back to zero even after a magnetic field is removed. Unfortunately, this behavior not only adversely affects the controllability of the MR brake but also increases the off-state torque. In experiments conducted, residual magnetization kept the off-state torque at 0.3 Nm (plot 1) after applying and removing 1.5 A coil current to cause unwanted off-state friction and reduced back-drive ability of the brake.

The controller was then modified. At the instant the brake was turned off, the controller was reactivated in the reverse direction with a very short impulse. An impulse with amplitude of 1 A and 55 ms duration was found to be enough to collapse the residual magnetic field reducing the off-state torque to 0.1 Nm from 0.3 Nm, as shown in plot 2 in FIG. 20. To compensate for the hysteresis observed in FIG. 20, a Hall-Effect sensor (Allegro A1323) was embedded into the MR-Brake. A groove 242 (FIG. 13C) was machined in the ring 224 to house the sensor 110. By using the sensor 110, the amount of magnetization of the ferromagnetic components can be observed, allowing the implementation of a feedback control system as shown in FIG. 5A or FIG. 5B.

A series of experiments were performed to examine the effect of the feedback control. The following section compares the MR brake response with the closed loop control system discussed herein and an open loop control system with direct current control. A virtual wall was placed in a simulation environment to assess how well the brake could simulate collision with a virtual surface (wall). A command force vector comes from the virtual environment and is normal to the wall surface. An input vector comes from the force applied to the joystick handle by the user indicating the intended motion. The control algorithm compares these vectors. If the dot product of the vectors is negative, the user is trying to penetrate the wall further and hence the brake is engaged. As shown in FIGS. 21A and 21B, the torque output was same for both cases. However the off-state friction was significantly less for the closed-loop control system (0.06 Nm) versus the open loop control system that does not use the Hall-Effect sensor (0.3 Nm).

Figure 22A:
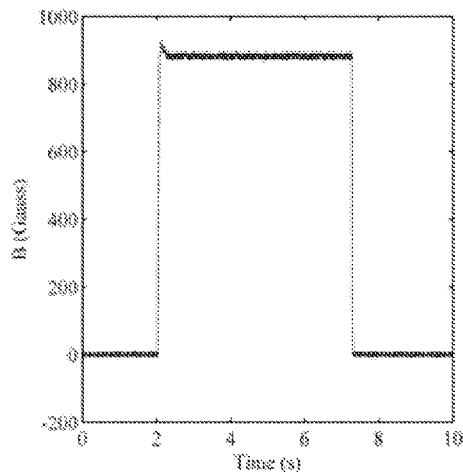
FIGS. 22A and 22B show sensor reading during wall collision performance experiments of using feedback control versus direct current control, respectively.
Figure 22B:
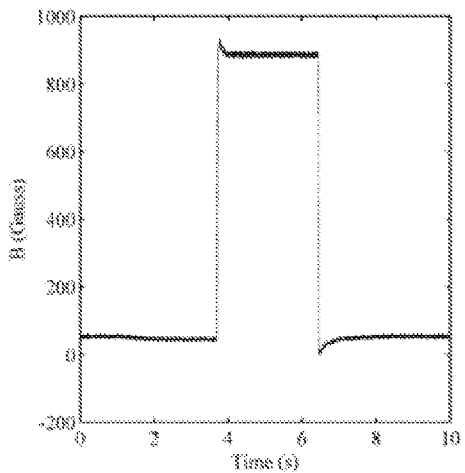

The residual off-state friction can be more clearly seen in FIGS. 22A and 22B, where the output from the Hall-Effect sensor is plotted before, during, and after the wall collision. In closed-loop mode, the PID controller operates to reduce or minimize the magnetic flux reading obtained from the MR brake by changing the input current. The effect can be seen in FIG. 22A: as the magnetic flux amplitude is zero both before and after the wall collision. In contrast, in the open loop mode, a 60 Gauss residual magnetic flux existed in the MR brake, as shown in FIG. 22B.

Figure 23A:
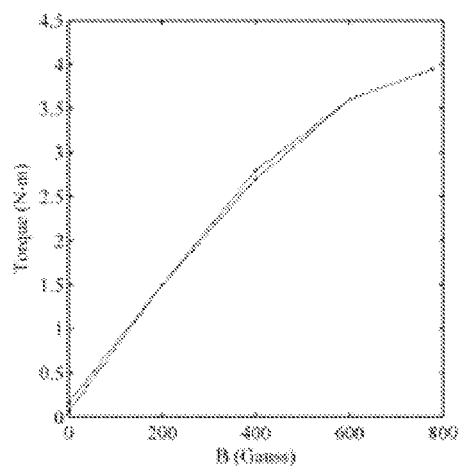
FIGS. 23A and 23B show torque responses of using feedback control and direct current control, respectively.
Figure 23B:
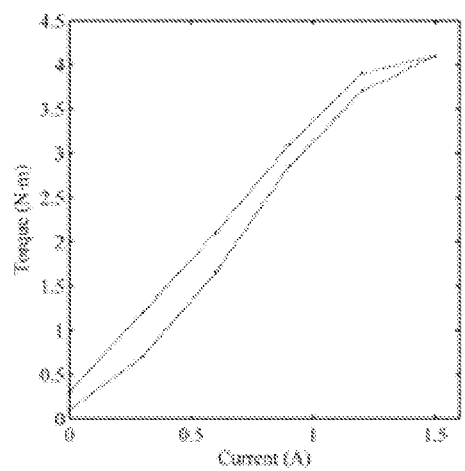

Additional experiments were conducted to determine the braking torque as a function of coil current or magnetic flux strength. For the closed-loop control system, the magnetic flux strength inside the MR brake was increased with 200 Gauss increments. The open loop system did not have the capability to control the magnetic flux directly so instead the current on the coil was increased by 0.3 Amps starting from zero to 1.5 A. Then, the current (or magnetic flux strength) was decreased using the same step size. The data from each step was taken in one minute intervals to achieve consistency in readings. Torque output of the MR brake was measured using the force sensor attached to the system. For closed loop mode the torque output with respect to the magnetic flux strength was plotted. As can be seen in FIG. 23A, virtually no hysteresis was observed. In contrast, the open-loop system displayed two separate curves for increasing and decreasing increments, which is characteristic of magnetic hysteresis, as shown in FIG. 23B.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A magnetorheological ("MR") device, comprising:
   an MR fluid;
   a shaft proximate and mechanically coupled to the MR fluid;
   a magnetic field generator configured to generate a magnetic flux through the MR fluid along a magnetic flux path; and
   a sensor positioned in the magnetic flux path, the sensor being configured to measure a current value of magnetic inductance of the magnetic flux flowing through the MR fluid.

2. The MR device of claim 1 wherein the sensor includes a Hall-effect sensor positioned in the magnetic flux path.

3. The MR device of claim 1, further comprising a plurality of ferromagnetic and paramagnetic rings around the shaft, the ferromagnetic and paramagnetic rings being arranged such that the magnetic flux path is a serpentine path.

4. The MR device of claim 1, further comprising a plurality of ferromagnetic and paramagnetic rings around the shaft, the ferromagnetic and paramagnetic rings being arranged such that the magnetic flux path is serpentine, wherein the sensor is positioned in the serpentine magnetic flux path.

5. The MR device of claim 1, further comprising:
   a controller operatively coupled to the magnetic field generator and the sensor, the controller having a processor and a non-transitory computer readable medium containing instructions that when executed by the processor, performs a process including:
      receiving the current value of magnetic inductance from the sensor; and
      reducing a hysteresis of torque output from the MR device based on the received current value of magnetic inductance from the sensor.

6. The MR device of claim 5 wherein reducing the hysteresis of torque output includes modulating the magnetic field generator based on the received current value of magnetic inductance and a target torque output from the MR device.

7. The MR device of claim 5 wherein the non-transitory computer readable medium also contains correlation data between torque output and magnetic inductance of the magnetic flux flowing through the MR fluid, and wherein reducing the hysteresis of torque output includes:
   determining a target magnetic inductance based on the target torque output and the correlation data between torque output and magnetic inductance stored in the non-transitory computer readable medium;
   calculating a difference between the target magnetic inductance and the received current value of magnetic inductance from the sensor; and
   modulating the magnetic field generator based on the calculated difference.

8. The MR device of claim 5 wherein the non-transitory computer readable medium also contains correlation data between torque output and magnetic inductance of the magnetic flux flowing through the MR fluid, and wherein reducing the hysteresis of torque output includes:
   determining a target magnetic inductance based on the target torque output and the correlation data between torque output and magnetic inductance stored in the non-transitory computer readable medium; and
   modulating the magnetic field generator with a proportional-integral-differential control loop using the target magnetic inductance as a set point and the received current value of magnetic inductance from the sensor as a process variable.

9. The MR device of claim 5 wherein:
   the MR device further includes a power supply electrically coupled to the magnetic field generator, the power supply being configured to supply a current to the magnetic field generator; and
   reducing the hysteresis of torque output includes adjusting the current to the magnetic field generator based on the received current value of magnetic inductance.

10. The MR device of claim 5 wherein:
    the MR device further includes a power supply electrically coupled to the magnetic field generator, the power supply being configured to supply a current to the magnetic field generator;
    reducing the hysteresis of torque output includes adjusting the current to the magnetic field generator based on the received current value of magnetic inductance; and
    the process performed according to the instructions further include continue adjusting the current to the magnetic field generator until the target torque output is substantially achieved.

11. A method for reducing torque output hysteresis in a magnetorheological ("MR") device having an MR fluid and a magnetic field generator configured to generate a magnetic flux through the MR fluid along a magnetic flux path, comprising:
    receiving a current value of magnetic inductance of the magnetic flux flowing through the MR fluid; and
    reducing a hysteresis of torque output from the MR device based on the received current value of magnetic inductance.

12. The method of claim 11 wherein reducing the hysteresis of torque output includes modulating the magnetic field generator based on the received current value of magnetic inductance and a target torque output from the MR device.

13. The method of claim 11 wherein reducing the hysteresis of torque output includes:
    determining a target magnetic inductance based on a target torque output and correlation data between torque output and magnetic inductance in the MR fluid; and
    modulating the magnetic field generator based on the target magnetic inductance and the current value of magnetic inductance of the magnetic flux flowing through the MR fluid.

14. The method of claim 11 wherein reducing the hysteresis of torque output includes:
    determining a target magnetic inductance based on the target torque output and the correlation data between torque output and magnetic inductance in the MR fluid; and
    modulating the magnetic field generator with a proportional-integral-differential control loop using the target magnetic inductance as a set point and the received current value of magnetic inductance as a process variable.

15. The method of claim 11 wherein:
    the MR device further includes a power supply electrically coupled to the magnetic field generator, the power supply being configured to supply a current to the magnetic field generator; and
    reducing the hysteresis of torque output includes adjusting the current to the magnetic field generator based on the received current value of magnetic inductance.

16. The method of claim 11 wherein:
the MR device further includes a power supply electrically coupled to the magnetic field generator, the power supply being configured to supply a current to the magnetic field generator;
reducing the hysteresis of torque output includes adjusting the current to the magnetic field generator based on the received current value of magnetic inductance; and
the process performed according to the instructions further include continue adjusting the current to the magnetic field generator until the target torque output is substantially achieved.

17. A controller having a processor and a non-transitory computer readable medium containing correlation data between torque output and magnetic inductance in an MR device and instructions that when executed by the processor, performs a process including:
calculating a target magnetic inductance based on a target torque output of the MR device and the correlation data between torque output and magnetic inductance in the MR device;
receiving a current value of magnetic inductance from a sensor embedded in the MR device; and
modulating a torque output from the MR device based on the received current value of magnetic inductance and the target magnetic inductance.

18. The controller of claim 17 wherein modulating the torque output includes substantially eliminating hysteresis of torque output of the MR device.

19. The controller of claim 17 wherein modulating the torque output includes modulating the torque output with a proportional-integral-differential control loop using the target magnetic inductance as a set point and the received current value of magnetic inductance as a process variable.

20. The controller of claim 17 wherein:
the MR device further includes a power supply electrically coupled to the MR device, the power supply being configured to supply a current to the MR device; and
modulating the torque output includes adjusting the current to the MR device based on the received current value of magnetic inductance.

21. The controller of claim 17 wherein:
the MR device further includes a power supply electrically coupled to the MR device, the power supply being configured to supply a current to the MR device;
modulating the torque output includes adjusting the current to the MR device based on the received current value of magnetic inductance; and
the process performed according to the instructions further include continue adjusting the current to the magnetic field generator until the target torque output is substantially achieved.

* * * * *